Nov. 9, 1965 G. SIM 3,216,755
DRIVE CONNECTOR FOR SHAFTS
Filed July 15, 1963

INVENTOR
GORDON SIM
BY E. F. Kane
ATTORNEY

3,216,755
DRIVE CONNECTOR FOR SHAFTS
Gordon Sim, Northbrook, Ill., assignor to Teletype Corporation, Skokie, Ill., a corporation of Delaware
Filed July 15, 1963, Ser. No. 294,943
5 Claims. (Cl. 287—100)

This invention relates to output connectors for rotary or oscillatable shafts and more particularly to a shaft connector readily attachable to a shaft to have a minimum of play with respect to the shaft.

It is an object of the invention to provide a connector for a shaft of the simplest possible construction which may be rigidly attached to the shaft with a minimum of play when in use.

In accordance with one embodiment of the invention the connector, which may serve as an output arm for an oscillatable shaft, comprises a member having a bifurcated portion, the arms of which have notches formed in their adjacent surfaces and one of the arms has a clearance hole for receiving a self-tapping screw which may be threaded through a pre-tapped hole in a shaft positioned between the arms of the bifurcated portion. The self-tapping screw is threaded into a hole in the other arm of the member, in which it cuts its own threads, thereby to clamp the member on the shaft at two points adjacent the clearance hole and to regulate the radial distance that the connector is positioned from the axis of the shaft, the threading of the screw through the shaft and into the hole which the screw taps in the opposite arm of the member will prevent oscillation of the connector with respect to the axis of the shaft.

A more complete understanding of the invention may be had by reference to the following detailed description when considered in conjunction with the accompanying drawing wherein.

Figure 1:
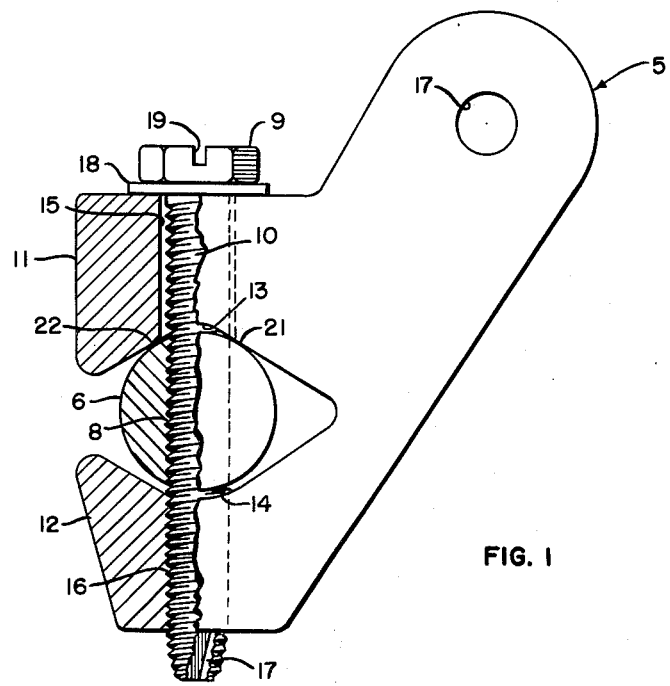
FIG. 1 is a view of a connector mounted on a shaft, parts being broken away to show, in section, the relation of the self-tapping screw to the arms of the connector and the shaft.
Figure 2:
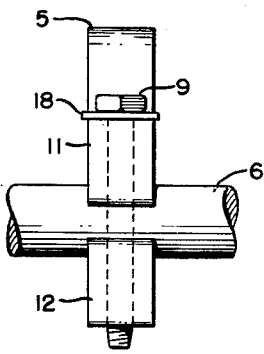
FIG. 2 is a view on a reduced scale showing a shaft in side elevation with a connector mounted on it.

Referring now to the drawing, wherein like reference numerals designate the same parts throughout the several views, and particularly to FIG. 1, it will be seen that a connector 5 is provided for attachment to a shaft 6. This connector may comprise any type of lever arm and as illustrated it is provided with a suitable aperture 7 for connection to other mechanism (not shown) to be driven by the connector. The shaft 6 has a tapped hole 8 extending through it, into which a self-tapping screw 9 may be threaded. The hole 8 is drilled and tapped along a predetermined radius of the shaft and the internal threads of the hole 8 are of a gauge to accept the threaded shank 10 of the self-tapping screw 9. The connector 5 may be formed from a malleable metal such as aluminum in which a self-tapping screw will cut threads to have a bifurcated portion comprised of arms 11 and 12, the inner surfaces of said arms having notches 13 and 14, respectively, formed in them. The arm 11 has a clearance hole 15 formed through it for freely receiving the threaded shank 10 of the screw 9 whereas the arm 12 has a hole or bore 16 formed in it which is of slightly smaller diameter than the maximum diameter of the threads on the shank 10 of the screw 9. The screw 9 is provided with the cutting grooves 17 whereby the screw 9 may cut threads in the arm 12 in the manner of a tap. As illustrated in the drawing, a lock washer 18 is provided and the screw 9 is provided with a hexagonal head which is slotted as shown at 19.

In the use of this connector, it may be slipped onto a shaft 6 which has previously had the tapped hole 8 formed in it, whereupon the screw 9 may be passed through the clearance hole 15 in the arm 11 and threaded through the shaft 6. As the lower, thread cutting end of the self-tapping screw 9 enters the hole 16 there will be some resistance to the entering of the screw into this hole 16 and the ultimate effect, as the screw cuts threads in the arm 2, will be to clamp the surfaces of the notch 13 into tight engagement with the periphery of the shaft at the points 21 and 22. This will serve accurately to lock the connector 5 in a predetermined position with respect to the axis of the shaft 6 in a radial direction. In other words, the surfaces of the notch 13 at the points 21 and 22 in cooperation with the peripheral surfaces of the shaft 6 will serve to accurately position the shaft 6 in one direction. This action will also serve to center the shank 10 of the screw 9 in the clearance hole 15 to effect the clamping action at the points 21 and 22. This last mentioned effect will also cooperate with the tight fit of the lower end of the shank 10 in the hole 16 to prevent any rotation of the connector 5 with respect to the shaft 6.

Figure 3:
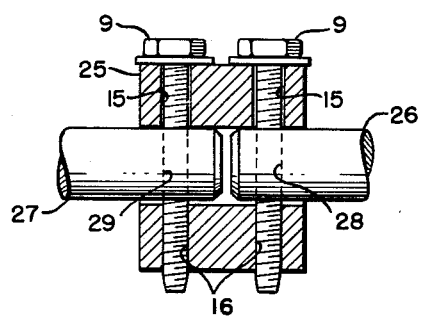
FIG. 3 is an illustrattion of an alternate embodiment of the invention utilizing the connector for the interconnecting a pair of axially aligned shafts.

An alternate embodiment of the invention is illustrated in FIG. 3 wherein a connector 25 having two clearance holes 15 in it for receiving two self-tapping screws 9 is placed on two axially aligned shafts 26 and 27 having threaded apertures 28 and 29, respectively, for receiving the threaded shanks of the screws 9, which will tap their own thread in holes 16 in the lower arm of the connector 25. The same rigidity of the connection between the shafts 26 and 27 will be effected as it was effected between the connector 5 and shaft 6 of the other embodiment of the invention.

Although only two embodiments of the invention are shown in the drawing and described in the foregoing specification, it will be understood that the invention is not limited to the specific embodiment described, but is capable of modification and rearrangement and substitution of parts and elements without departing from the spirit of the invention.

What is claimed is:
1. A motion transmitting connector comprising,
   (a) a round shaft having a threaded aperture,
   (b) a bifurcated body portion having two arms which have adjacent surfaces thereof spaced so as to provide clearance between the arms and receiving said shaft therebetween,
   (c) a clearance passage in one arm of said body portion receiving the shank of a self-tapping screw, said passage being of larger diameter than the shank of said screw,
   (d) a screw receiving hole in the other arm of said body portion having an inside diameter slightly smaller than the maximum outside diameter of the self-tapping screw received in the clearance passage, and
   (e) said self-tapping screw extending through said clearance passage and having a threaded shank with a tapping end threadedly engaging said threaded aperture of said shaft to force the said surface on one of said arms into clamping engagement with the peripheral surface of said shaft, said screw also being threaded into said screw receiving hole to cut threads in the hole and to cooperate with said surfaces for fixing the bifurcated body portion against rotation about said shaft by effecting intimate registry of the screw threads and the hole.
2. A motion transmitting connector comprising,
   (a) a round shaft having a tapped hole extending radially through it,

(b) a bifurcated body portion having two arms which have adjacent surfaces thereof spaced so as to provide clearance between the arms and receiving said shaft therebetween, (c) a clearance passage in one arm of said body portion receiving the shank of a self-tapping screw, said passage being of larger diameter than the shank of said screw, (d) a screw receiving bore in the other arm of said body portion axially aligned with said clearance hole and having an inside diameter slightly smaller than the maximum outside diameter of the self-tapping screw received in said passage, and, (e) said self-tapping screw extending through said clearance passage and having a threaded shank with a tapping end threadedly engaging said tapped hole of said shaft to force the said surface on one of said arms into clamping engagement with the peripheral surface of said shaft, said screw also being threaded into said aligned screw receiving bore to cut threads in the bore and to cooperate with said surfaces for fixing the bifurcated body portion against rotation about said shaft by effecting intimate registry of the screw threads and the bore.

3. A motion transmitting connector for a shaft having a tapped radial hole through it comprising (a) a bifurcated body portion, the two arms of which have notches on adjacent faces thereof to provide clearance between the arms for receiving said shaft, said shaft being positioned between the arms and within the notches, (b) a clearance passage in one arm of said body portion for receiving the shank of a self-tapping screw, said passage being of larger diameter than the shank of said screw, (c) a screw receiving hole in the other arm of said body portion having an inside diameter slightly smaller than the maximum outside diameter of the screw it receives, (d) surfaces on one of said notches for clamping engagement with said shaft, and (e) a self-tapping screw extending through said passage and threaded through the tapped hole in the shaft to clamp said surfaces against the shaft and self-threaded into said screw receiving hole to effect intimate registry of the screw and hole thereby to cooperate with the surfaces on said notch in clamping engagement with the shaft for fixing the connector against rotation about the shaft.

4. A motion transmitting connector for a shaft having a tapped radial hole through it comprising (a) a bifurcated body portion, the two arms of which have notches on adjacent faces thereof to provide clearance between the arms for receiving said shaft, the notch in one arm being substantially V-shaped, said shaft being positioned between the arms and in said notches, (b) a clearance passage in said one arm of said body portion and intersecting the apex of said V-shaped notch for receiving the shank of a self-tapping screw, said passage being of larger diameter than the shank of said screw, (c) a screw receiving bore in the other arm of said body portion having an inside diameter slightly smaller than the maximum outside diameter of the screw it receives, (d) surfaces on said V-shaped notch for clamping engagement with said shaft, and (e) a self-tapping screw extending through said passage and threaded through the tapped hole in the shaft to clamp said surfaces against the shaft and self-threaded into said screw receiving bore to effect intimate registry of the screw and bore thereby to cooperate with the surfaces on said V-shaped notch in clamping engagement with the shaft for fixing the connector against rotation about the shaft.

5. A motion transmitting connector for a shaft having a tapped radial hole through it comprising (a) a bifurcated body portion, the two arms of which have notches on adjacent faces thereof to provide clearance between the arms, said shaft being positioned in said clearance, (b) a clearance passage in one arm of said body portion and terminating at the apex of the notch in said one arm for receiving the shank of a self-tapping screw, said passage being of larger diameter than the shank of said screw, (c) a screw receiving bore in the other arm of said body portion axially aligned with said clearance passage and having an inside diameter slightly smaller than the maximum outside diameter of the screw it receives, (d) surfaces extending from the apex of the notch in said one arm for clamping engagement with said shaft, and (e) a self-tapping screw extending through said passage threaded through the tapped hole in the shaft to clamp said surfaces against the shaft, and self-threaded into said screw receiving hole to effect intimate registry of the screw and hole thereby to cooperate with the surfaces on said notch in clamping engagement with the shaft for fixing the connector against rotation about the shaft.

References Cited by the Examiner

UNITED STATES PATENTS

| 438,608 | 10/90 | Davis | 287—52.08 |
| 535,425 | 3/95 | Stimson. | |
| 745,568 | 12/03 | Caley | 292—356 |
| 1,212,361 | 1/17 | Kennedy | 287—52.08 X |
| 1,638,230 | 8/27 | Alsaker | 85—1 |
| 1,963,542 | 6/34 | Bergstrom | 85—47 |
| 2,002,781 | 5/35 | Leighton | 287—100 |
| 2,582,679 | 1/52 | Carroll | 287—111 X |
| 3,029,489 | 4/62 | Nelson | 24—263.3 |

FOREIGN PATENTS

| 158,930 | 2/21 | Great Britain. |

CARL W. TOMLIN, *Primary Examiner.*